June 23, 1953   O. H. BRAUER   2,643,152
SOUND DEADENING MEANS FOR CAR WHEELS
Filed Oct. 5, 1950
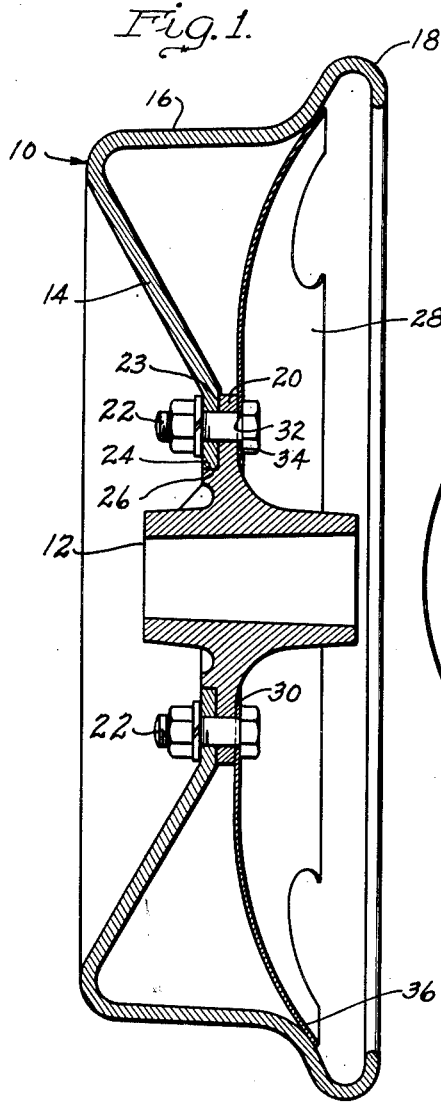
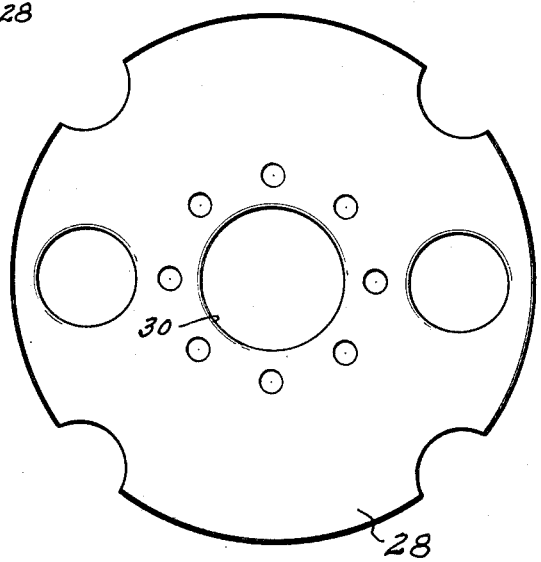
Inventor
OTTO H. BRAUER
by Paul L. Kroher
Atty.

Patented June 23, 1953

2,643,152

UNITED STATES PATENT OFFICE 2,643,152

SOUND DEADENING MEANS FOR CAR WHEELS

Otto H. Brauer, Three Rivers, Mich., assignor to Fairbanks, Morse & Co., Chicago, Ill., a corporation of Illinois Application October 5, 1950, Serial No. 188,637

3 Claims. (Cl. 295—7)

This invention relates to improvements in the construction of car wheels. More particularly it has to do with novel and effective means for deadening or dampening noise-producing vibrations in rail car wheels.

Heretofore various devices have been used on car wheels in an attempt to reduce or eliminate excessive and objectionable noise resulting from wheel vibrations in normal rail travel. Many of these devices have employed a plastic or semi-solid non-resonant material to absorb the vibrations and while such devices have enjoyed a limited amount of success the use of plastic material presents many problems in regard to retaining the material in noise-absorbing contact with the wheel parts during rapid rotation of the wheel.

It is, therefore, an object of this invention to provide a relatively simple and effective vibration deadening device which overcomes the difficulties heretofore encountered particularly in connection with plastic material dampers, and which is adapted to be easily and securely attached to a car wheel.

Another object of this invention is the provision of a rigid, resonant member that has a natural frequency substantially different from and opposed to the frequency of the component parts of the car wheel whereby contact between the member and said parts will reduce or eliminate the vibrations of the car wheel.

According to the teachings of the present invention, a dish-shaped disk is removably secured near its center adjacent the hub of a car wheel and has its outer peripheral portion disposed firmly against an annular side surface of the rim of the wheel. The wheel has a central hub portion, a radial web and a substantially cylindrical rim, each portion having a thickness considerably greater than the thickness of the disk. Thus, due to the difference in shape and thickness of material, the two members have substantially different vibrating frequencies. Therefore, when vibrations are set up in the car wheel by contact with the track, the disc having its outer peripheral edge portion in contact with the wheel, will function to dampen the vibrations therein in the same manner as the vibrations of a tuning fork are reduced or eliminated by touching the fork with one's finger.

Other and further features, objects and advantages of the present invention will be apparent to one skilled in the art from the following detail description taken in connection with the accompanying drawings wherein:

Fig. 1 is a vertical sectional view taken centrally through a car wheel and illustrating a sound deadening disk constructed according to the teaching of the present invention.

Fig. 2 is a front elevational view of a sound deadening disk separated from the car wheel.

In Fig. 1 the reference numeral 10 indicates a car wheel which comprises a rigid tubular hub 12, a radially extending segmental conical web 14, and a generally tubular rim or tread 16. A beaded flange 18 extends substantially radially outward from the rim 16. The web, rim and flange may be integrally formed and secured to a radially projecting flange 20 of the hub 12 by a plurality of bolts 22 which clamp the web 14 against a face 23 of the flange 20. The web 14 has a central opening 24 in which a shoulder 26 of the flange 20 is positioned.

A disk 28 of dish-shaped configuration has a central opening 30 receiving the hub 12. The bolts 22 also pass through openings 32 in the disk to secure it against the opposite face 34 of the flange 20.

The outer marginal edge 36 of the disk 28 is pressed against a marginal portion of the rim 16 on the under side thereof in the region of the flange 18 due to the tightening of the bolts 22. The disk may suitably be made of a resilient material such as strip steel and so arranged that the tightening of the bolts 22 will cause a deflection of the disk near the edge 36. In this manner the edge 36 will be resiliently pressed into vibration-absorbing contact with the rim. It is particularly noted that the marginal edge 36 of sound-damping disc 28 is not rigidly secured to the wheel rim 16 or to the flange 18, and thus it does not vibrate as a unit with the rim but is free to oppose the vibrating movement of the rim.

As is clearly seen in Fig. 1, the disk 28 has a thickness preferably uniform throughout, which is very materially less than the thickness of the rim and web parts of the wheel. Moreover, in the present example the rim and web are provided by a single pressed steel member, while the hub 12 is of forged steel, and the disk 28 is by preference, of 20 gauge strip steel stamped and pressed to the shape illustrated. Consequently, and importantly to the present invention, the damping disk and the rim and web member will have different periods or frequencies of vibration, so that the disk 28 will function effectively in the structural arrangement above described, to dampen wheel vibrations and thereby reduce wheel noise at least to a negligible noise level.

While the disk 28 has been described as being made of a metal such as strip steel having a definite vibrating frequency, it is also within the scope of this invention to make the disk of some other suitable metallic or non-metallic material capable of functioning as hereindescribed or of lead or other soft metal which has a very low capacity for transmitting vibrations. It is evident that a lead disk for example, would not only interrupt and reduce the vibration of the car wheel in the manner as hereindescribed but would also tend to absorb such vibrations.

I claim as my invention:

1. A wheel structure comprising a generally cylindrical hub having a radially extending outer flange, a sheet metal body member having a ring portion secured to said flange, a web portion slanting radially outwardly and axially away from a transverse plane through said flange, and a tubular, axially extending rim portion connected to said web and having a free peripheral edge, and a sound-deadening member secured to said flange and extending radially outwardly and axially away from said web on the opposite side of said transverse plane and into contact at its outer peripheral edge with said rim portion in the region of its free peripheral edge.

2. In a wheel structure, a wheel mounting hub having a radial flange, a unitary wheel body providing a web member engaging one side of said radial hub flange and extending outwardly therefrom divergently with respect to the plane of the hub flange, said wheel body further providing a cylindrical rim terminating in a rim flange, a vibration reducing disc member having an inner circular margin engaging the opposite side of said radial hub flange, said disc member extending divergently with respect to said web member and having its outer margin in engagement with said rim flange, and means common to the web and disc members, securing said members to said radial hub flange.

3. In a wheel structure, a wheel mounting hub having a radial flange, a unitary wheel body providing a web member engaging one side of the radial hub flange and projecting therefrom divergently with respect to the plane of the hub flange, said wheel body further providing a cylindrical rim terminating in a beaded rim flange, a vibration reducing disc member having an inner circular margin engaging the opposite side of said hub flange, the disc member extending divergently with respect to said web member and having its outer margin in engagement with the underside of said beaded rim flange, and attachment means common to the web and disc members, securing said members to said hub flange, said attachment means in securing the disc member to the hub flange, stressing the disc member such that its said outer margin is in pressed engagement with the underside of the said beaded rim flange.

OTTO H. BRAUER.

References Cited in the file of this patent
UNITED STATES PATENTS

| Number | Name | Date |
|---|---|---|
| 1,813,820 | Ross | July 7, 1931 |
| 1,818,447 | Baker | Aug. 11, 1931 |
| 2,267,311 | Smith | Dec. 23, 1941 |